Patented Apr. 15, 1947

2,418,977

UNITED STATES PATENT OFFICE 2,418,977

PRODUCTION OF BROMOPYRIDINES

Samuel M. McElvain and Melvin A. Goese,
Madison, Wis.

No Drawing. Application June 2, 1943,
Serial No. 489,386

8 Claims. (Cl. 260—290)

Our invention relates to the production of 3-bromopyridine. The object of the invention is to produce and recover 3-bromopyridine efficiently and economically.

It is known that pyridine may be brominated. It has been brominated in various positions; including the 3 position and the 3,5 positions, to produce 3-bromopyridine and 3,5-dibromopyridine.

Heretofore, however, the processes used for producing 3-bromopyridine have had many disadvantages. They have not been adapted to produce 3-bromopyridine commercially, or in large quantities; or they have required conditions which are difficult or unsatisfactory; or the yields have been low; or the products of the reaction have been such that it has been difficult to separate and recover in pure form the 3-bromopyridine produced; or a plurality of or all these disadvantages.

By our invention these disadvantages are largely if not wholly avoided.

The problem of producing 3-bromopyridine resolves itself into two parts: first, causing the bromine to enter the pyridine nucleus at the 3 position; and, second, separating and purifying the 3-bromopyridine produced from copresent material.

According to our procedure, we brominate pyridine hydrochloride by first causing it to react with bromine, to produce a perbromide of pyridine hydrochloride. The exact structure of this perbromide is not known. It may be a mixture of the types of perbromides that are formed from pyridine hydrobromide and bromine in glacial acetic acid which have been described by Englert and McElvain [J. Amer. Chem. Soc. 51, 863 (1929)]. Suffice it to say, the pyridine hydrochloride and the bromine somehow unite to form a compound of sufficient stability to permit it to be heated at atmospheric pressure without the loss of any of the bromine. This fact makes unnecessary either the heating of the pyridine salt with bromine in a sealed tube or the passing of bromine vapor through the molten pyridine salt, as have been done by some of the previous investigators. [Hofmann, Ber. 12, 988 (1879); Ciamician and Silber, Ber. 18, 721 (1885); Blau, Monatsh. 10, 372 (1889); Koenigs et al., Ber. 61, 1022 (1928); Maier-Bode, Ber. 69, 1534 (1936).] This perbromide of pyridine hydrochloride then is heated, and we find that bromine enters the pyridine and does so mainly at the 3 and 3,5 positions.

In carrying out this bromination, we may simply mix liquid bromine with solid pyridine hydrochloride, at room temperature, and then heat the mixture at atmospheric pressure and at carefully regulated temperatures until the evolution of hydrogen chloride ceases. In this heating we are careful that the temperature does not rise sufficiently high to cause dissociation of any hydrochlorides.

After the bromination is completed, as indicated by the cessation of the evolution of hydrogen chloride, we subject the remaining mixture to fractional distillation under diminished pressure. The temperature (200–215°) of the heating bath used in this distillation causes the 3,5-dibromopyridine to distil from the reaction mixture mainly in the form of the free base. This is followed by the 3-bromopyridine hydrochloride, in which form the 3-bromopyridine appears to distil, since it collects in the receiver as such, leaving behind the unreacted pyridine as the hydrochloride and hydrobromide salts. In this way the brominated pyridines are separated from the salts of the unchanged pyridine (a heating-bath temperature of 250° and 20–25 mm. pressure is necessary to cause distillation of pyridine hydrochloride); which latter may be recovered, if desired, by making the reaction residue alkaline and extracting the liberated pyridine with a suitable solvent, such as ether, benzene, or petroleum ether.

The 3-bromopyridine may readily be recovered from the distillate mixture of 3-bromopyridine and 3,5-dibromopyridine salt. One convenient way to do that is to treat the distillate mixture with an aqueous solution of sodium hydroxide, and then to extract the water suspension of the brominated pyridine with benzene. By fractional distillation under diminished pressure of the benzene extract thus obtained, we first obtain 3-bromopyridine; which distils off at about 61° to 62° C. at a pressure of about 15 mm. of mercury, while leaving behind as a residue the 3,5 dibromopyridine. The latter has a melting point of 111° C. after recrystallization from alcohol.

In this way, we can get yields of about 35 to 40 percent of the desired 3-bromopyridine. This 3-bromopyridine contains no noticeable amount of any of the 4-brominated pyridines which are formed in some of the other bromination processes, and which cause solid products to form in the 3-bromopyridine.

The perbromide of pyridine hydrochloride may be easily and quickly prepared, without special conditions. It is necessary merely to mix liquid bromine with solid pyridine hydrochloride at room temperature, and then to heat the resultant mixture carefully as noted above to drive off hydrogen chloride.

The following are examples of our procedure:

*Example 1.*—To 271 g. of dry pyridine hydrochloride (2.4 mols) contained in a 1-liter 3-necked round-bottom flask add 192 g. (1.2 mols) of liquid bromine. A suitable stirrer is mounted in the central neck of this flask; and the other two necks of the flask are connected respectively to an air condenser set for downward distillation, and to a separatory funnel by which the bromine is added.

The air condenser is connected to a receiver which consists of a 1-liter flask with a side arm of wide (1.5 cm.) bore. After the bromine has been added the separatory funnel is removed and the flask-neck that held it is closed with a stopper.

Then external heat is applied to the flask. At about 100° C. the material melts completely. At about 160° C. the evolution of hydrogen chloride starts. This latter temperature is maintained for about an hour, during which time the evolved hydrogen chloride is passed off through the condenser and the side arm of the receiver and is absorbed in water. Then the temperature is raised to about 195° to 200° C., but not above about 200° C., and held there for another hour; during this latter heating period much of the hydrogen chloride that is combined with the 3,5-dibromopyridine is driven off. At the end of this heating period the evolution of hydrogen chloride will have practically ceased. During all this time it is desirable that the stirring mechanism be in operation.

When the evolution of hydrogen chloride has ceased, the side arm of the receiving flask is connected to a suitable vacuum pump to reduce the pressure in the reaction flask to about 25 mm. of mercury. A water pump is satisfactory. At about the same time, or shortly after, the temperature in the reaction flask is raised, with stirring, to between 200° and 215° C. This causes a rapid distillation first of 3,5-dibromopyridine as the free base followed by the 3-bromopyridine which collects in the receiver and air condenser as the solid hydrochloride. This solidification in the air condenser may necessitate the application of heat, as by a free flame, to that air condenser to drive the distillate through it into the receiving flask.

After about 5-10 minutes under the diminished pressure and temperature indicated, substantially no more material comes over from the reaction flask or solidifies in the air condenser, and stirring of the residue in the reaction flask becomes difficult.

The reaction products that are now in the receiving flask are treated with 40 g. of sodium hydroxide in 200 ml. of water to convert the hydrochlorides to the free bases, and then are extracted with two 100 ml. portions of benzene. The benzene extract is subjected to fractional distillation. The 3-bromopyridine distils off, leaving in the distilling flask a residue of 3,5-dibromopyridine.

The yield of 3-bromopyridine is about 71 g. (about 37 percent), and the yield of 3,5-dibromopyridine is about 39 g. (about 27 percent). The 3-bromopyridine obtained has a boiling point of 61°-62° C. at 15 mm. pressure; and the 3,5-dibromopyridine, after recrystallization from alcohol, has a melting point of 111° C.

The pyridine of the unreacted pyridine hydrochloride in the original reaction flask may be recovered if desired. This is conveniently done by making the residue in the reaction flask alkaline, as with aqueous sodium hydroxide solution, and extracting the benzene. When this benzene extract is distilled, only unchanged pyridine is obtained.

If the yield of the 3-bromopyridine is calculated on the basis of pyridine not recovered from the reaction residue, it indicates a 41 percent conversion.

Example 2.—The foregoing example may be repeated, using different molecular ratios between the initial pyridine hydrochloride and the initial bromine. The results actually obtained with some of these different molecular ratios are indicated by the following table:

| Mol Ratio of Pyridine Hydrochloride to Bromine | Yield of 3-bromopyridine per cent | Yield of 3,5-dibromopyridine per cent |
|---|---|---|
| 1.5:1 | 26 | 38 |
| 2:1 (from Example 1 above) | 37 | 27 |
| 3:1 | 38 | 29 |

Thus, even with quite widely varying proportions of reactants the method gives satisfactory yields of both 3-bromopyridine and 3,5-dibromopyridine. But we prefer that there be at least two molecular equivalents of pyridine hydrochloride to one molecular equivalent of bromine in order to get the larger yields of the 3-bromopyridine.

From the 3-bromopyridine it is possible to obtain nicotinamide in a manner constituting no part of the invention of the present application.

We claim as our invention:

1. The process of producing 3-bromopyridine and 3,5-dibromopyridine, which consists in putting liquid bromine and solid pyridine hydrochloride together, heating the mixture at atmospheric pressure first to about 160° C. and then to about 195-200° C. until at each of those temperatures the evolution of hydrogen chloride practically ceases, and then heating the mixture further at diminished pressure to distil from the reaction mixture 3,5-dibromopyridine and 3-bromopyridine, with the latter condensing in the form of its hydrochloride.

2. The process as set forth in claim 1, with the addition of the step of separating the 3-bromopyridine and the 3,5-dibromopyridine obtained.

3. The process as set forth in claim 1, with the addition of the step of recovering 3-bromopyridine from the mixture of 3-bromopyridine and 3,5-dibromopyridine.

4. The process as set forth in claim 1, with the addition of the steps of converting said hydrochloride in the distillate to the free base, and then fractionally distilling the mixture of 3-bromopyridine and 3,5-dibromopyridine to recover the 3-bromopyridine therefrom.

5. The process as set forth in claim 1, with the addition that the heating to distil 3,5-dibromopyridine and 3-bromopyridine at diminished pressure from the reaction mixture is at a temperature between 200° and 215° C.

6. The process as set forth in claim 1, with the addition that the weight of pyridine hydrochloride exceeds the weight of bromine used.

7. The process as set forth in claim 1, with the addition that there is a molecular excess of the pyridine hydrochloride over the bromine.

8. The process as set forth in claim 1, with the addition that at least two molecular equivalents of pyridine hydrochloride are used to one molecular equivalent of bromine.

SAMUEL M. McELVAIN.
MELVIN A. GOESE.

REFERENCES CITED

The following references are of record in the file of this patent:

Maier-Bodie, "Das Pyridine and Siener Derivative," Division 59, p. 82.

Blau, "Monatshefte für Chemie", vol. 10, pgs. 372-374.

Englert, March 1929, Journal American Chem. Soc., pgs. 863-866.